(12) United States Patent
Quitadamo et al.

(10) Patent No.: US 8,883,082 B1
(45) Date of Patent: Nov. 11, 2014

(54) GAS DISTRIBUTORS FOR CIRCULATING FLUIDIZED BED REACTORS

(71) Applicant: Babcock Power Development LLC, Worchester, MA (US)

(72) Inventors: Matthew Quitadamo, West Boylston, MA (US); Kimbal Hall, Princeton, MA (US); Martin J. Kozlak, Enfield, CT (US); Angelos Kokkinos, Ayer, MA (US)

(73) Assignee: Babcock Power Development LLC, Worcester, MA (US)

( * ) Notice: Subject to any disclaimer, the term of this patent is extended or adjusted under 35 U.S.C. 154(b) by 0 days.

(21) Appl. No.: 14/040,114

(22) Filed: Sep. 27, 2013

(51) Int. Cl.
  *B01D 53/83*   (2006.01)
  *B01D 53/50*   (2006.01)
(52) U.S. Cl.
  CPC .............. *B01D 53/83* (2013.01); *B01D 53/508* (2013.01)
  USPC ........................... 422/176; 422/139; 422/168
(58) Field of Classification Search
  CPC ...... B01D 53/83; B01D 53/508; B01D 53/12; B01J 8/44
  USPC ......... 422/139, 140, 143, 145, 147, 168, 176; 423/DIG. 16; 96/105; 110/243, 244, 110/245; 34/582, 583, 585; 432/15, 58
  See application file for complete search history.

(56) References Cited

U.S. PATENT DOCUMENTS

| | | | |
|---|---|---|---|
| 3,544,086 A | 12/1970 | Willett | |
| 3,584,440 A | 6/1971 | Vigil | |
| 3,638,925 A | 2/1972 | Braemer | |
| 3,729,898 A | 5/1973 | Richardson | |
| 3,877,488 A | 4/1975 | Baturay et al. | |
| 4,023,942 A | 5/1977 | Brady et al. | |
| 4,043,772 A | 8/1977 | Lundy | |
| 4,548,797 A | 10/1985 | Sauer et al. | |
| 4,644,800 A | 2/1987 | Kozlak | |
| 4,810,478 A | 3/1989 | Graf | |
| 5,382,418 A * | 1/1995 | Thone et al. | ............... 423/239.1 |
| 5,948,145 A | 9/1999 | Welch | |

(Continued)

OTHER PUBLICATIONS

Reddy Karri, S. B. and Knowlton, Ted M. Gas Distributor and Plenum Design in Fluidized Beds. Chapter 4. Yang, W-C. (1998). Fluidization, Solids Handling, and Processing—Industrial Applications. William Andrew Publishing/Noyes. Online version available at: http://www.knovel.com/web/portal/browse/display?_EXT_KNOVEL_DISPLAY_bookid=413&VerticalID=0.

(Continued)

*Primary Examiner* — Jill Warden
*Assistant Examiner* — Joye L Woodard
(74) *Attorney, Agent, or Firm* — Edwards Wildman Palmer LLP; Joshua L. Jones; Alicia J. Esposito

(57) ABSTRACT

A distributor for a circulating dry scrubber reactor includes a venturi section with a venturi section wall extending from a venturi section inlet to a venturi section outlet along a longitudinal axis, with the venturi section inlet connected to an inlet plenum and the venturi section outlet connected to a circulating dry scrubber reactor. A hub is mounted within the venturi section wall with an annular converging-diverging flow path defined between the venturi section wall and the hub for distribution of gas flow from the venturi section outlet into a circulating dry scrubber reactor space and for maintaining stable bed fluidization in a CDS system at a comparatively low system pressure loss.

25 Claims, 6 Drawing Sheets

(56) References Cited

U.S. PATENT DOCUMENTS

| | | |
|---|---|---|
| 6,511,637 B2 | 1/2003 | Bundy |
| 6,609,857 B1 | 8/2003 | Hjortstam et al. |
| 7,014,682 B2 | 3/2006 | Hickerson et al. |
| 2003/0020186 A1 | 1/2003 | Hargrove et al. |
| 2013/0095018 A1 | 4/2013 | Pilats |

OTHER PUBLICATIONS

Geldart, D. And Baeyens J. The Design of Distributors for Gas-Fluidized Beds. Powder Technology, 42 (1985) 67-78.

Jinbang, Hu, Yanping, Li, and Anxin, Chen. Flow Field of Circulating Fluidized Bed Reactor with Venturi Inlet Configuration. Transactions of Tianjin University, 11, 2 (2005) 106-109.

\* cited by examiner

GAS DISTRIBUTORS FOR CIRCULATING FLUIDIZED BED REACTORS

BACKGROUND OF THE INVENTION

1. Field of the Invention

The present invention relates to circulating fluidized bed (CFB) gas distributors and more particularly to systems for gas distribution and bed stability in circulating dry scrubber (CDS).

2. Description of Related Art

The concept of circulating dry scrubbing is well known in the art. See, for example, Neathery, J. K., "A Fundamental Study of Circulating Bed Absorption for Flue Gas Desulfurization," Ph.D. Dissertation, University of Kentucky, 1993. CDS technology has many advantages over other systems such as limestone wet flue-gas desulfurization (FGD) and lime-based spray drying absorption (SDA). Among the most appealing benefits of CDS are: low capital costs, small footprint, simple construction with few moving parts, carbon steel construction, the absence of a liquid blowdown stream to be treated, and the production of a dry spent sorbent product.

CDS technology incorporates dry sorbent recirculation in a lean-phase transport reactor to achieve sulfur capture. Hydrated lime and humidification water are injected into the bottom of a reaction chamber concurrently with flue gas. The flue gas suspends, dries, and transports the sorbent through the reaction vessel and out into a particulate collector. A large portion of both the spent and unutilized sorbent streams are recycled into the reactor vessel as a dry powder. The recycle of sorbent, from both within the reactor and via the particulate control device, improves the sorbent utilization over other semi-dry methods such as SDA. However, since the flue gas is to remain several degrees above the wet bulb or saturation temperature, the liquid phase coverage of the recycled solids quickly evaporates due to the excellent mass transfer and the abundant surface area available in the riser section.

The venturi section of the CDS reactor acts as a flue gas distributor by ensuring that the influent flue gas is uniformly disbursed across the cross-section area of the riser, as well as maintaining a stable bed fluidization. The use of traditional distributor types, such as perforated plates, bubble caps, spargers, or conical grids for the conditions involved with Flue Gas Desulfurization (FGD) results in plugging which, in turn, causes bed instabilities such as solids drop-out ("sifting" or "weeping") or gas laning. Venturi distributors allow for a lower operating differential pressure and decreased erosion. Conventional CDS reactors utilize either single or multiple venturi arrangements, depending on the amount of gas to be handled. Most common multiple venturi arrangement includes one central venturi with six circumferentially located venturis.

Besides the number of venturis, the major differences between the single and multiple venturi distributor designs are the installed height required for uniformly disbursing the influent flue gas prior to the gas entering the CDS reactor and the ratio of distributor to bed pressure drop for ensuring bed stability. For conventional venturi-type distributors, multiple venturi designs can reduce distributor height by as much as three times as compared to a single venturi design. However, the height savings comes at the cost of increased venturi pressure drop required to ensure bed stability, such that as much as five times greater operating pressure drop can be required as compared to single venturi designs. As the operating costs associated with pressure drop typically greatly outweigh capital costs associated with reactor height (i.e. reactor and structural support materials), single venturi distributors are often utilized, but without the improved height requirements associated with multiple distributors.

Such conventional distributor systems have generally been considered satisfactory for their intended purpose. However, there is still a need in the art for systems with improved pressure drop and height requirements. There also remains a need in the art for such systems and methods that are easy to make and use. The present disclosure provides a solution for these problems as well as significant improvements in other criteria that describe a hydrodynamically effective CDS system.

SUMMARY OF THE INVENTION

A distributor for a circulating dry scrubber reactor includes a venturi section with a venturi section wall extending from a venturi section inlet to a venturi section outlet along a longitudinal axis and a hub mounted within the venturi section wall. The venturi section inlet is configured and adapted to be connected to an inlet plenum and the venturi section outlet is configured and adapted to be connected to a circulating fluidized bed reactor. An annular converging-diverging flow path is defined between the venturi section wall and the hub for distribution of gas flow from the venturi section outlet into a circulating dry scrubber reactor space and for maintaining stable bed fluidization.

In certain embodiments, the distributor can include an inlet plenum in fluid communication with the venturi section inlet to supply a flow of gas to the annular converging-diverging flow path. The inlet plenum can be substantially square in cross-section. It is also contemplated that the distributor can include at least one "ladder" vane mounted inside an elbow connecting the inlet plenum to the venturi section wall for directing flow through the elbow to the venturi section. For example, there can be multiple ladder vanes spaced apart axially and laterally relative to the longitudinal axis. At least one portion of the venturi section wall can define a frustoconical wall that tapers inward toward the hub. The frustoconical wall and a corresponding part of the hub can define a converging area or the diverging area of the converging-diverging flow path. Similarly, a portion of the venturi section wall can define a cylindrical wall. The cylindrical wall and a corresponding part of the hub can define a diverging area of the converging-diverging flow path.

In another aspect, the hub can include an inlet section defining a diverging portion of the flow path in a direction from the venturi section inlet to the venturi section outlet. The hub can also include an outlet section defining a converging portion of the flow path in the direction from the venturi section inlet to the venturi section outlet. The hub can also include a cylindrical section connecting the inlet and outlet sections of the hub. The inlet section of the hub can be substantially conical and can have a conical angle of about 60° to about 90°. The inlet section of the hub can also be substantially hemispherical. Similarly, the outlet section of the hub can be substantially conical and can have a conical angle of about 40° to about 90°. For example, the conical angle of the inlet section of the hub can be 70° and the conical angle of the outlet section of the hub can be 60°. The outlet section of the hub can be frustoconical and can have a tip portion that defines a frustocone truncated about 7% to about 10% short of a full cone. A lifting ring can be mounted to the truncated tip portion of the outlet section. The inlet section of the hub can have a vertex with an axial position at or below the venturi section inlet of the venturi section wall relative to the longitudinal axis. The outlet section of the hub can have an axial high point with a common axial position with the venturi section outlet of the venturi section wall relative to the longitudinal axis.

In certain embodiments, the hub has a diameter of at about 40% to about 90% of the diameter of the venturi section wall. For example, the hub can have a diameter of about 58% of the diameter of the venturi section wall. It is also contemplated that the venturi section wall can have a length in an axial direction with respect to the longitudinal axis that is about 70% to about 140% as long as the diameter of the venturi section wall. For example, the hub can have a length of about 85% of the length of the venturi section wall. In an embodiment, a plurality of supports can mount the hub to the venturi section wall. In another embodiment, at least one support at an end of the hub can mount the hub to the venturi section wall.

A new and useful circulating dry scrubber includes a circulating dry scrubber reactor with an inlet for introducing flue gas and a reactor space for circulating particles for treating flue gas within the reactor space. A distributor as described above is included, wherein the venturi section outlet of the distributor is in fluid communication with the inlet of the reactor to supply flue gas thereto.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject invention appertains will readily understand how to make and use the devices of the subject invention without undue experimentation, preferred embodiments thereof will be described in detail herein below with reference to certain figures, wherein.

DETAILED DESCRIPTION OF THE PREFERRED EMBODIMENTS

Figure 1:
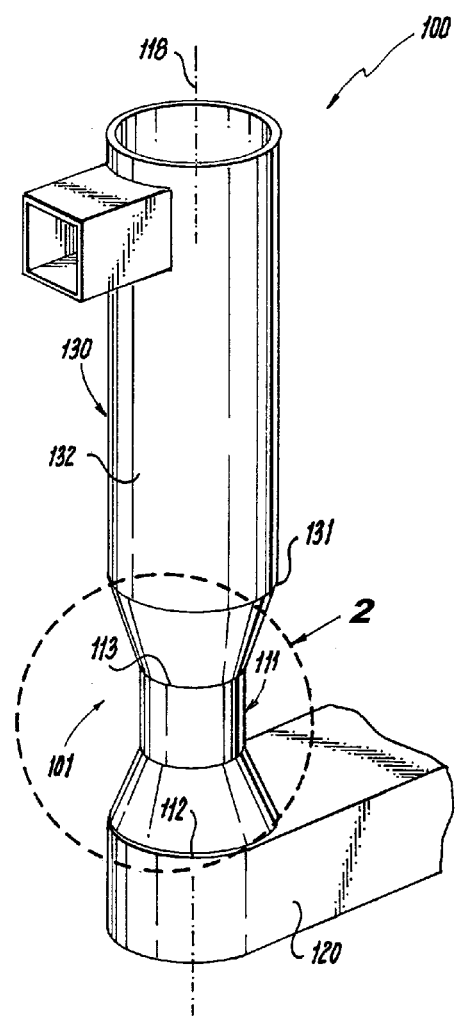
FIG. 1 is a schematic perspective view of an exemplary embodiment of a CDS reactor constructed in accordance with the present invention.
Figure 2:
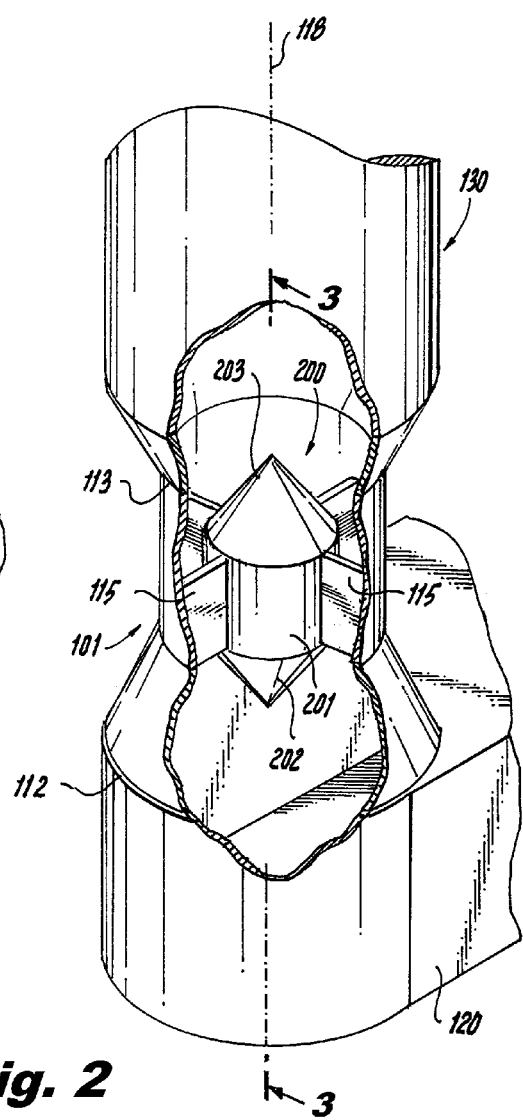
FIG. 2 is a schematic cut-away perspective view, taken at Section 2 of FIG. 1 showing the hub within the venturi section of the CDS distributor.
Figure 3:
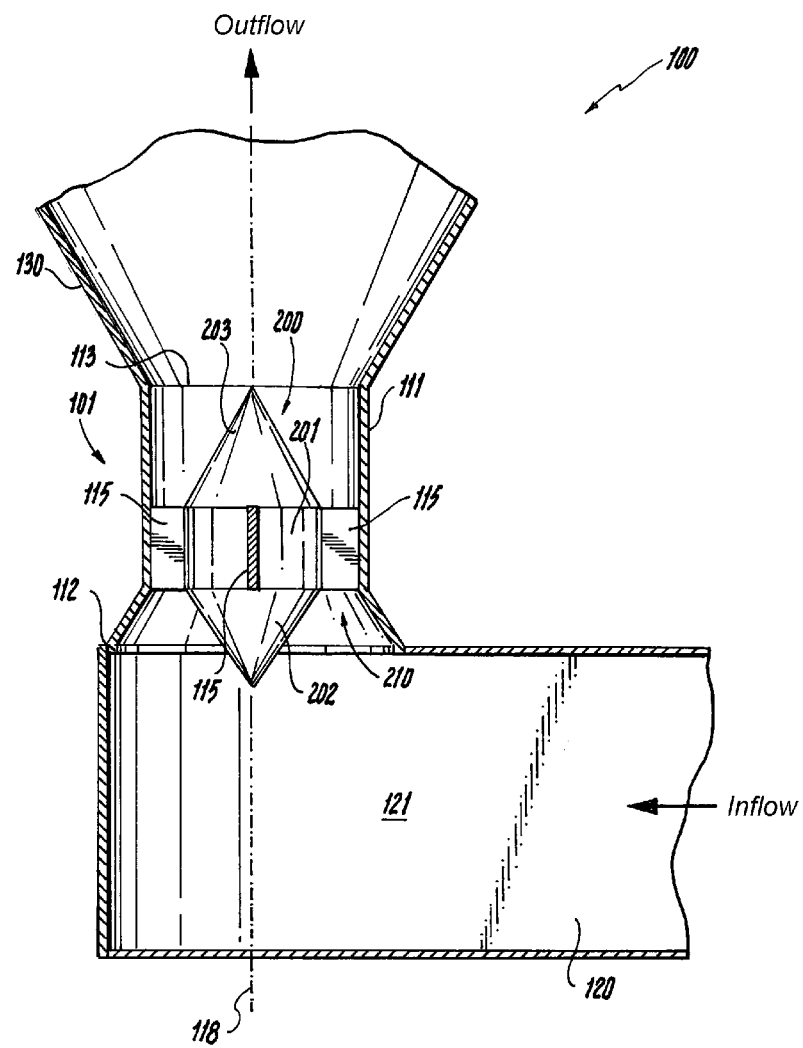
FIG. 3 is a schematic cross-sectional side elevation view of a CDS reactor constructed in accordance with the present invention, showing the annular converging-diverging flow path through the venturi section.

Reference will now be made to the drawings wherein like reference numerals identify similar structural features or aspects of the subject invention. For purposes of explanation and illustration, and not limitation, a partial view of an exemplary embodiment of a circulating dry scrubber (CDS) system with gas distributor in accordance with the disclosure is shown in FIG. 1 and is designated generally by reference character 100. Other features of CDS systems and gas distributors in accordance with the disclosure, or aspects thereof, are provided in FIGS. 2-6, as will be described. The systems and methods of the disclosure can be used to uniformly distribute flue gas across the cross-sectional area of the riser, and maintain a stable bed fluidization in a CDS system at a comparatively low system pressure loss.

The present disclosure includes a system for the distributor for a CDS reactor system. In other CFB reactors, distributors such as perforated plates, bubble caps, spargers, or conical grids are used. The use of these CFB distributor types for the conditions involved with Flue Gas Desulfurization (FGD) results in plugging which in turn creates bed instabilities, such as solids drop-out or gas laning. A venturi distributor allows for lower operating pressure differential, improved stability, and decreased erosion due to plugging. Multiple venturi designs offer the benefit of a lower installed distributor height. However, such multiple venturi designs can also result in an even larger required pressure drop to ensure bed stability.

A single venturi is hydrodynamically more stable than multiple venturis in parallel because flow in the diffusers of the parallel venturis can separate and re-attach, which causes a time-varying pressure loss in each venturi, even when operating with a pure gas flow with no intermixed solids. Adding solids to the flow further increases the amplitude of the time-varying pressure loss. Additionally, a higher throat velocity is needed in the multiple venturi arrangement to suspend a given amount of solids without breakthrough as compared to a single venturi. A single venturi also has a larger hydraulic diameter than a multiple venturi arrangement with the same flow area. Thus the jet penetration of the single venturi into the reaction vessel is much greater than that of a multiple venturi arrangement. However a high jet penetration is undesirable for a core-annulus reactor flow regime and for the reaction rates inside the vessel.

A potential advantage of the disclosed systems and methods is that the system retains the low pressure differential of a single venturi distributor while also maintaining a low distributor height requirement due to a radially centered internal hub in the throat section of the venturi. An annular venturi with a hub, mounted within the venturi section wall of the throat, and an annular converging-diverging flow path defined between the venturi section wall and the hub, has a hydraulic diameter comparable to that of a multi-venturi arrangement, and thus also has a more favorable reactor flow pattern and a shorter jet decay length. Also similar to a multiple venturi, an annular venturi has a longer perimeter edge length which is better for solids entrainment into the gas flow. Unlike the multi-venturi configuration, the annular venturi can be made with no flat surfaces within the reactor to accumulate solids, and also behaves as a single venturi in having only one diffuser to reduce/minimize time-varying pressure loss.

The annular venturi of the present disclosure is designed as a two-stage solids entrainment device. Solids run down the diffuser cone into the diverging component of the venturi distributor, where most of the solids particles are entrained. It is the nature of the solids flow to have some denser clusters of solids. With a single-stage solids entrainment device, such as traditional single and multiple venturi arrangements, any clusters or solids that are introduced into the venturi throat need to be completely entrained by the gas flow, or they deposit on the inlet plenum floor. This means that the gas flow needs to be high enough to entrain the largest clusters present in the flow. With a two-stage entrainment device, the large clusters impact the top cone of the internal hub, which breaks the clusters apart.

There are several other advantages associated with this aspect of the two-stage entrainment device. Firstly, by breaking the solids clusters apart, the entrainment velocity required to suspend the smaller clusters and individual particles is much lower. Next, as the solids slide down the upper cone of the internal hub, the cone area increases and the solids concentration thus thins out. As a result of this, the clustering effect on the second stage is significantly reduced compared to the first stage, and again the gas velocity required for entrainment is lower. Another advantage is that breaking the clusters up via impact on the top of the hub acts as an attrition process that exposes new active surfaces on the reagent, making the reagent utilization better. Lastly, the two-stage entrainment of the annular design provides a dispersal mechanism for the solids feed system because the dense feed from the recycle system feeding unreacted reagent along with reactor byproduct into the reactor impacts directly onto the hub, and disperses the solids feed into a fine particle dispersion that is more easily entrained in the gas flow. This allows the recycled solids injection nozzle penetration to be placed lower in the tower, also lowering the particulate capture device, and reducing system cost and complexity.

Another significant effect of breaking the cluster size down with the two stage entrainment in the annular venturi is that the solids pressure required for a given gas pressure to entrain a given mass flow of solids is reduced by up to about 50% compared to a traditional single venturi. Thus at the same gas pressure, the annular venturi injects twice the mass flow of solids to get to the same solids pressure as a traditional single venturi. Since the solids feed control system is based on solids pressure loss, and the chemical reaction rate is tied more closely to solids mass flow rate and bed density, one of two desirable operating options can be selected: either the annular venturi can operate at the same pressure loss as the single venturi with a significantly higher solids loading and potentially better capture efficiency, or the annular venturi can operate with the same capture efficiency as the single venturi but with significantly lower pressure loss. Any suitably intermediate operation can also be used.

Referring now to FIG. 1, there is shown an exemplary embodiment of the present disclosure for a CDS system 100. CDS system 100 includes a CDS reactor 130 with an inlet 131 for introducing flue gas and a CDS reactor space 132 for circulating particles for treating flue gas within the reactor space 132. The CDS system 100 also includes a distributor 101 with a venturi section outlet 113 in fluid communication with the inlet 131 of the reactor to supply flue gas thereto.

Distributor 101 is a single annular venturi-type distributor, including a throat or venturi section with a venturi section wall 111 extending from a venturi section inlet 112 to a venturi section outlet 113 along a longitudinal axis 118. A cutaway view at Section 2 of FIG. 1 is shown in FIG. 2, where a hub 200 is mounted within the venturi section wall 111. An inlet plenum 120 is connected to the venturi section inlet 112 and the circulating dry scrubber reactor 130 is connected to the venturi section outlet 113.

With reference now to FIG. 3, the interior region between the venturi section wall 111 and the hub 200 define an annular converging-diverging flow path 210 for distribution of gas flow from the venturi section outlet 113 into the space of the CDS reactor 130. In certain embodiments, distributor 101 includes an inlet plenum 120 in fluid communication with the venturi section inlet 112 to supply a flow of gas to the annular converging-diverging flow path 210. Now referring back to FIG. 1, the inlet plenum 120 is substantially square in cross-section, transitioning to an inscribed circular section at the venturi section inlet 112. This square-to-circle transition is beneficial in that it reduces the cross sectional area, and accelerates the flow through the corner, which promotes flow attachment and minimizes pressure loss. The further contraction of the inlet plenum 120 into the venturi section also helps with the good flow distribution, which is important for solids entrainment. The inlet plenum 120 can be made rectangular, but if it is much wider than it is tall, the benefit of accelerating flow through the venturi section inlet 112 may be diminished, and the velocity profile in the venturi section may suffer.

Referring to FIGS. 2-3, the hub 200 has an inlet section 202 diverging in a direction from the venturi section inlet 112 to the venturi section outlet 113, and an outlet section 203 converging in a direction from the venturi section inlet 112 to the venturi section outlet 113. A cylindrical section 201 connects the inlet section 202 to the outlet section 203. As shown in FIG. 3, the walls of the venturi section inlet 112 and the inlet section 202 taper away from the annular converging-diverging flow path 210 downward along the longitudinal axis 118. This allows any solids that are sliding down the vertical venturi section wall 111 and the cylindrical section of the hub 201, to detach from the walls, and become entrained in the gas flow again, which helps with low load performance. The hub 200 is supported within the venturi section wall 111 by four supports 115. Any suitable number of hub supports 115 can be used; however, hub supports 115 should present minimal obstruction to the flow, and should be kept clear of the sharp angle where the hub outlet section 203 meets the hub cylindrical section 201. The hub can also be supported by at least one support at an end of the hub 200, mounting the hub 200 to the venturi section wall 111. Interference in this area has been shown to cause small amounts of solids drop out, and may be an area of higher erosion.

As shown in FIGS. 1-3, the inlet section 202 and outlet section 203 are conical in shape, with the inlet section 202 having a conical included angle in the range of about 60° to about 90°, and the outlet section 203 having a conical included angle of about 40° to 90°. For example, the conical angle of the inlet section 202 can be 70° and the conical angle of the outlet section 203 can be 60°. As shown in FIG. 3, the hub inlet section 202 has a vertex with an axial position at or below the venturi section inlet 112 of the venturi section wall 111 relative to the longitudinal axis 118. With such a configuration, re-entrainment at the venturi section inlet 112 happens at the highest gas velocity possible. The hub outlet section 203 has a vertex at a common axial position with the venturi section outlet 113 of the venturi section wall 111 relative to the longitudinal axis 118.

The hub 200 has an outer diameter of at least about 58% the diameter of the inner venturi section wall 111 so that solids sliding down the wall of the venturi section outlet 113 impact on the hub outlet section 203 rather than the vertical venturi section wall 111 or hub cylindrical section 201. A hub diameter of approximately 40% to 90% of the diameter of the venturi section wall 111 provides additional margin. The length of the venturi section wall 111 in an axial direction with respect to the longitudinal axis 118 is at least about 70% to 140% as long as the diameter of the inner venturi section wall 111. For example, the hub 200 can have a length of about 85% of the length of the venturi section wall 111.

Figure 4:
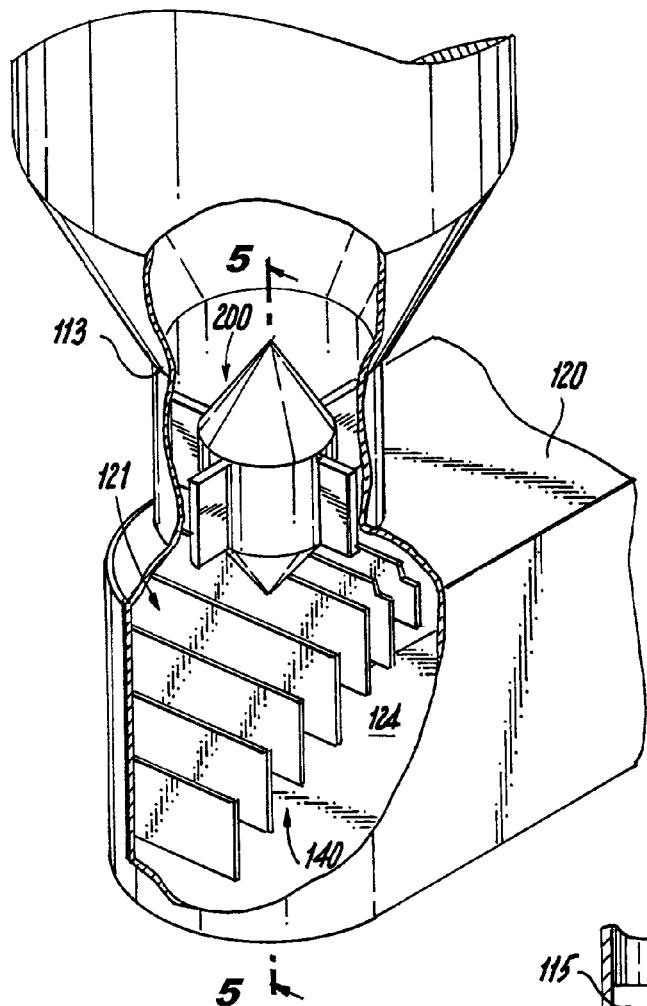
FIG. 4 is a schematic perspective view of another exemplary embodiment of a CDS reactor constructed in accordance with the present invention, showing ladder vanes in an elbow connecting the inlet plenum to the venturi section.
Figure 5:
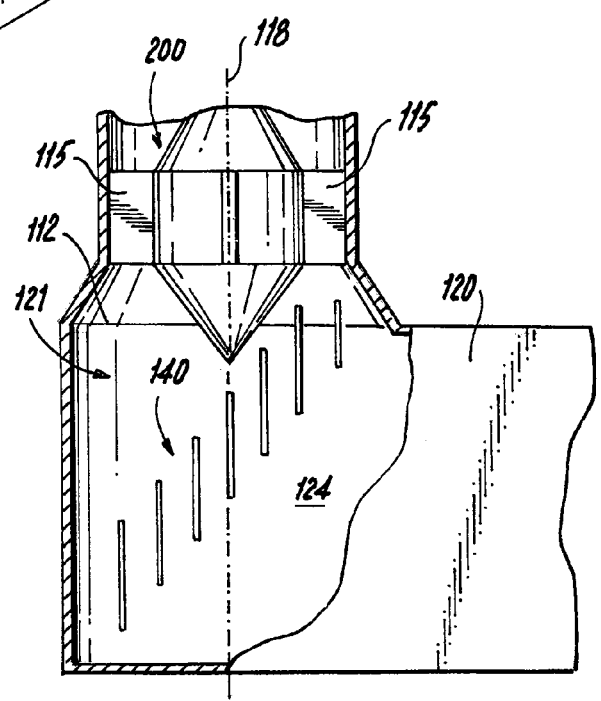
FIG. 5 is a schematic cross-sectional side elevation view, taken at Section 5 of FIG. 4, showing alignment of the ladder vanes in an elbow connecting the inlet plenum to the venturi section.

Referring now to FIGS. 4-5, the CDS system 100 optionally includes at least one ladder vane 140 mounted inside an elbow 124 connecting the inlet plenum 120 to the venturi section wall 111 for directing flow through the elbow 124 to the venturi section. Seven ladder vanes 140 are mounted inside the elbow 124 and spaced apart axially and laterally relative to the longitudinal axis 118. The ladder vanes 140 are oriented parallel to the longitudinal axis 118 and traverse the inlet plenum 120 laterally help the flow to turn upward from the inlet plenum 120 into the venturi section, while keeping a good flow distribution entering the venturi section, but do not catch solids like a curved vane would with leading edges parallel to the flow in the inlet plenum. The ladder vanes 140 have a pressure face that forms jets providing another place for solids entrainment. The ladder vanes 140 are also capable of being erosion resistant by virtue of the ash impact angle. However, if erosion is still a concern, the ladder vanes 140 can be fitted with abrasion resistant wear plates. The hub inlet section 202 should not interfere with the ladder vanes 140. The angle of the hub inlet section 202 can be increased to as much as 90° without significant effect to eliminate interference with the ladder vanes 140, and also reducing weight. The hub inlet section 202 can also be made into an elliptical section, which may reduce pressure loss.

The back 121 of the inlet plenum 120 is round, conforming to the shape of the venturi section inlet 112. This has the benefit of a smooth transition into the venturi section in the back of the inlet plenum 120. It also has the benefit of increasing the gas velocity along the floor of the inlet plenum 120 under the last ladder vane 140 to sweep any solids that fall through the ladder vanes 140 into the back corner of the inlet plenum 120. This enables a very small hopper to be used, which keeps the installation height low, and reduces cost. The inlet plenum 120 can be designed for a gas velocity of approximately 50 to 60-ft/s, for example.

Figure 6A:
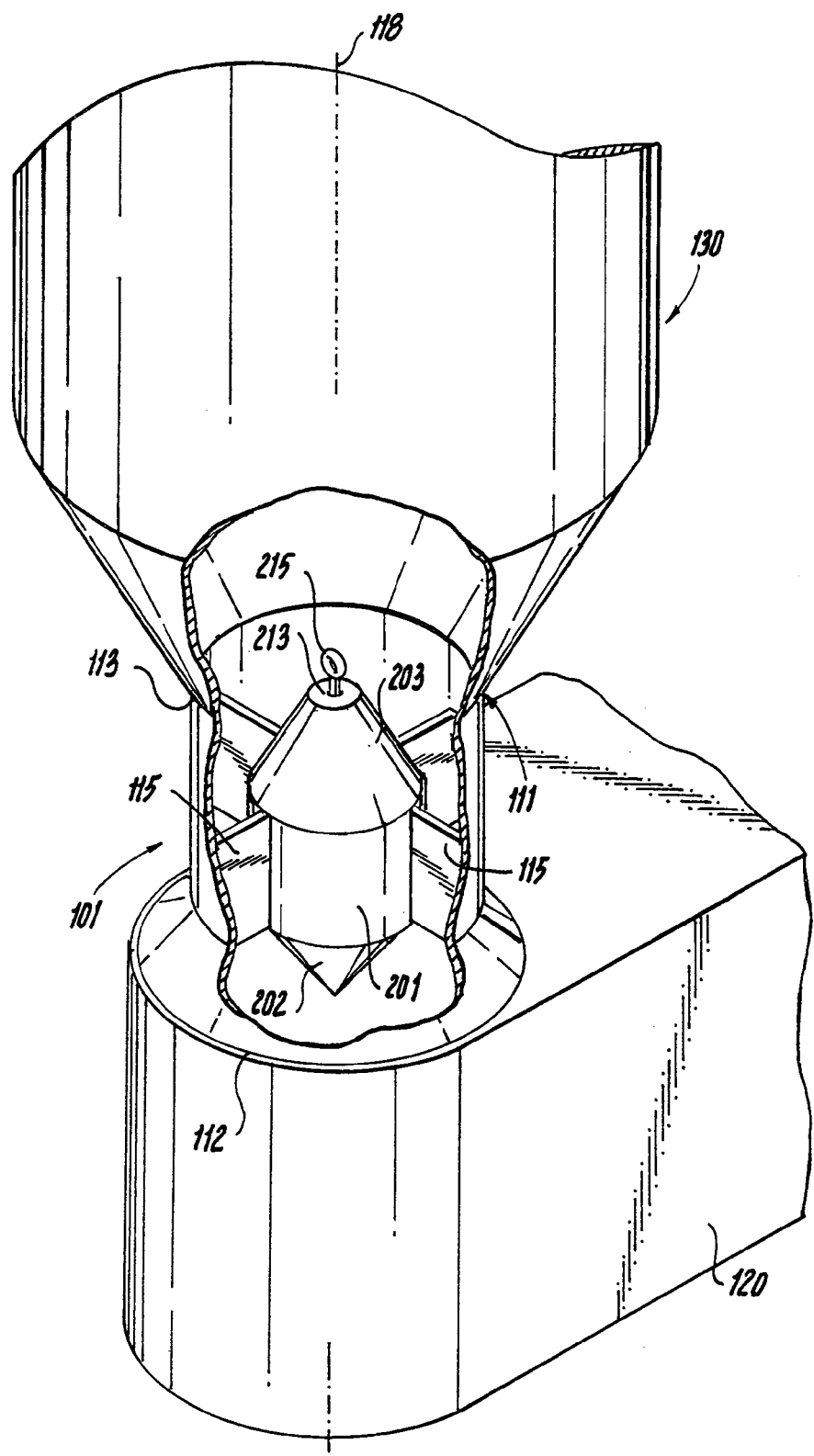
FIGS. 6a and 6b are schematic perspective views two exemplary embodiments of a CDS reactor constructed in accordance with the present invention, with FIG. 6a showing the upper half of the distributor with a truncated cone and lifting ring and FIG. 6b showing the upper half of the distributor with a truncated cone with a support plate bolted to the top.
Figure 6B:
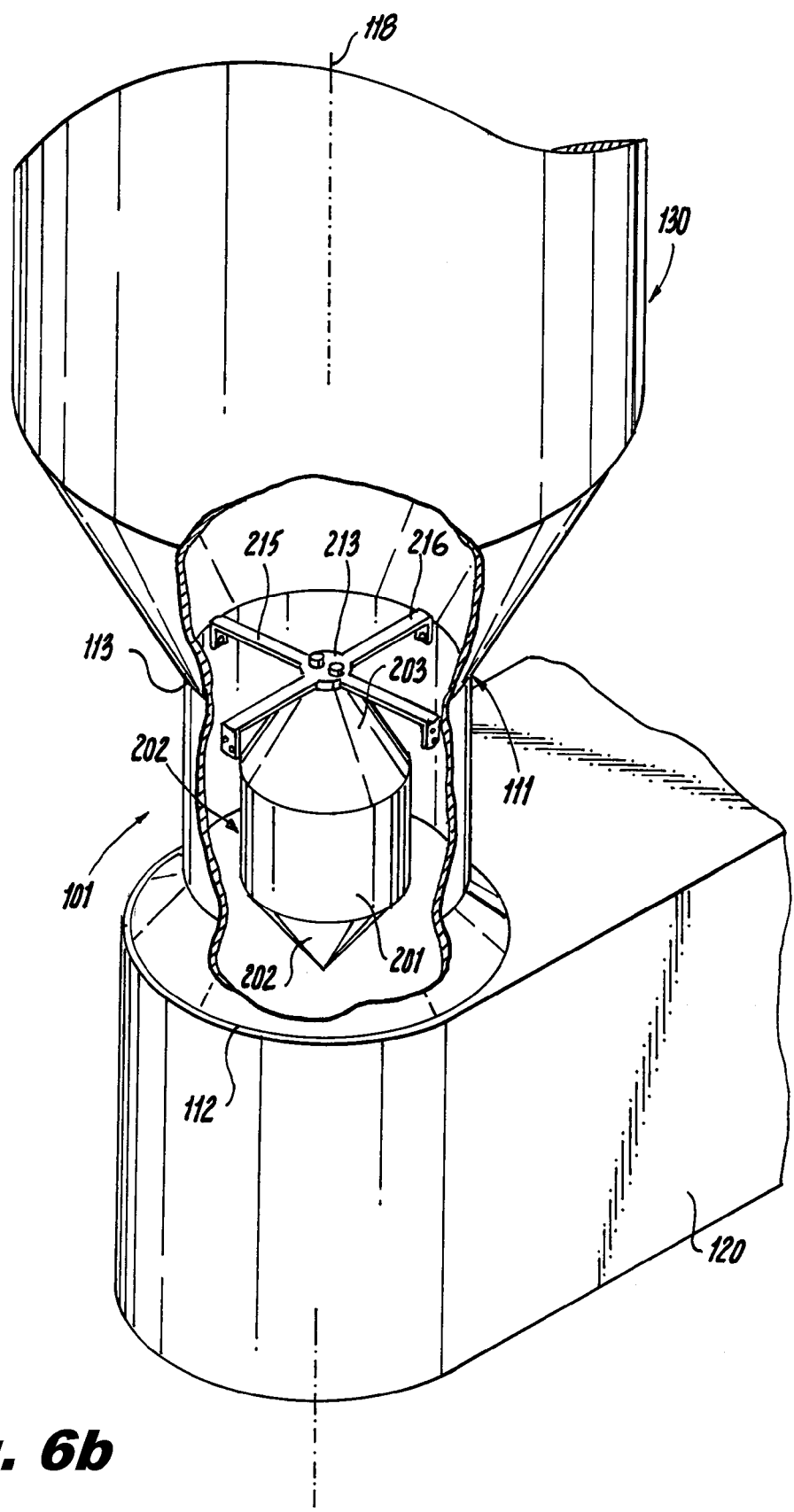

The conical included angle of the hub outlet section 203 is important to maintain at about 40° to 90°, and the angle between the cylindrical section 201 and outlet section 203 should be sharp. If fabrication of the point of the outlet section 203 is difficult, the top 7-12% of the cone may be cut off flat. Such a configuration will not result in loss of performance since the flow is separated in this area. Now referring to the embodiment shown in FIGS. 6a and 6b, the hub outlet section 203 has a tip portion 213 that defines a frustocone truncated about 7-12% short of a full cone. As shown in the embodiment in FIG. 6a, there is also a lifting ring 215 mounted to the truncated tip portion 213 of the outlet section 203 for use in construction and maintenance of the distributor 101. As shown in FIG. 6b, the truncated tip portion 213 can also have a support plate 216 bolted thereon to support the hub 201 within the venturi section wall 111.

Figure 7:
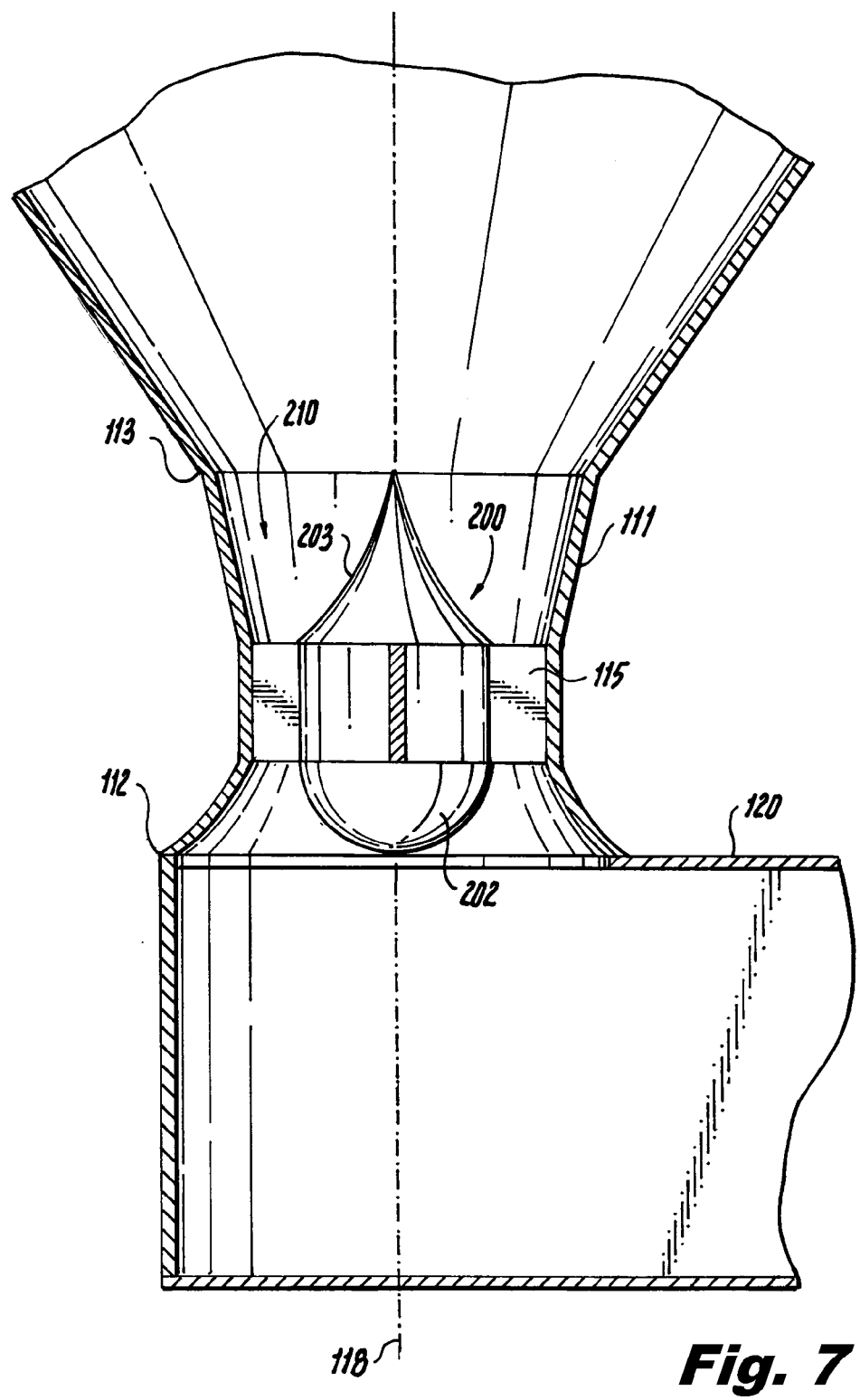
FIG. 7 is a schematic cross-section side elevation view of a distributor constructed in accordance with the present invention, showing variation in the shape of the distributor and the venturi section walls.

The hub 201 does not require symmetry with the encompassing venturi section wall 111. The converging-diverging flow path 210 can be defined by sloping both the outlet venturi wall 111 along with the hub outlet section 203 or by sloping the hub outlet section 203 alone. As shown in FIGS. 1-6, the venturi section wall 111 defines a frustoconical wall starting at approximately the venturi section inlet 112, with the frustoconical wall tapering inward towards the hub 200, such that the converging portion of the converging-diverging flow path 210 is defined. In other embodiments, such as shown in FIG. 7, the venturi section wall 111 defines a frustoconical wall starting at approximately the venturi section outlet 113, with the frustoconical wall tapering inward towards the midsection of the hub 200, such that the diverging portion of the converging-diverging flow path 210 is defined. In other embodiments, a portion of the venturi section wall 111 defines a cylindrical wall, where the cylindrical wall and corresponding portions of the hub define the converging-diverging flow path 210. Similar to the venturi wall having various shapes, the portions of the hub can have various shapes. In addition to the inlet and outlet section forming cones, the hub inlet section 202 can be hemispherical or concavely tapered conical. The hub outlet section 203 can be frustoconical or convexly tapered conical.

The hub 200 can be made to be easily removed and replaced, to enable the unit to be operated at gas flows higher or lower than designed at minimal cost. Additionally, the configuration of the inlet plenum 120 is intended to be easily adaptable to new or existing plant ductwork, with reasonable gas velocity profiles. The ladder vanes 140 and continual contraction into the venturi section will help to smooth poor velocity profiles, while effectively maintaining a bed of solids.

The systems of the present invention, as described above and shown in the drawings, provide for an annular single venturi-type distributor for a CDS reactor with superior properties including a reduced height requirement and a low pressure differential. While the apparatus and methods of the subject invention have been shown and described with reference to preferred embodiments, those skilled in the art will readily appreciate that changes and/or modifications may be made thereto without departing from the spirit and scope of the subject invention.

What is claimed is:

1. A distributor for a circulating dry scrubber reactor comprising:
   a venturi section including a venturi section wall extending from a venturi section inlet to a venturi section outlet along a longitudinal axis, wherein the venturi section inlet is configured and adapted to be connected to an inlet plenum and the venturi section outlet is configured and adapted to be connected to a circulating dry scrubber reactor; and
   a hub mounted within the venturi section wall with an annular converging-diverging flow path defined between the venturi section wall and the hub for distribution of gas flow from the venturi section outlet into a circulating dry scrubber reactor space and for maintaining stable bed fluidization, wherein the hub includes an outlet section that defines a diverging portion of the flow path in the direction from the venturi section inlet to the venturi section outlet, wherein at least a portion of the outlet section of the hub is below the venturi section outlet of the venturi section wall relative to the longitudinal axis.

2. A distributor as recited in claim 1, further comprising an inlet plenum in fluid communication with the venturi section inlet to supply a flow of gas to the annular converging-diverging flow path.

3. A distributor as recited in claim 1, wherein at least one portion of the venturi section wall defines a frustoconical wall and the frustoconical wall tapers inward toward the hub.

4. A distributor as recited in claim 3, wherein the frustoconical wall and a corresponding part of the hub define a converging area of the converging-diverging flow path.

5. A distributor as recited in claim 3, wherein the frustoconical wall and a corresponding part of the hub define a diverging area of the converging-diverging flow path.

6. A distributor as recited in claim 1, wherein a portion of the venturi section wall defines a cylindrical wall.

7. A distributor as recited in claim 6, wherein the cylindrical wall and a corresponding part of the hub define a diverging area of the converging-diverging flow path.

8. A distributor as recited in claim 1, wherein the hub includes an inlet section that defines a converging portion of the flow path in a direction from the venturi section inlet to the venturi section outlet.

9. A distributor as recited in claim 8, wherein the inlet section of the hub is substantially conical.

10. A distributor as recited in claim 9, wherein the inlet section cone has a conical angle of about 60° to about 90°.

11. A distributor as recited in claim 1, wherein the outlet section of the hub is substantially conical.

12. A distributor as recited in claim 11, wherein the outlet section cone has a conical angle of about 40° to about 90°.

13. A distributor as recited in claim 8, wherein the inlet section of the hub is substantially hemispherical.

14. A distributor as recited in claim 1, wherein the outlet section of the hub is frustoconical.

15. A distributor as recited in claim 11, wherein a tip portion of the outlet section cone defines a frustocone truncated about 7% to about 12% short of a full cone.

16. A distributor as recited in claim 14, wherein a lifting ring is mounted to the truncated tip portion of the hub outlet section.

17. A distributor as recited in claim 8, wherein the hub includes a cylindrical section connecting the inlet and outlet sections of the hub.

18. A distributor as recited in claim 8, wherein the inlet section of the hub has a vertex with an axial position at or below the venturi section inlet of the venturi section wall relative to the longitudinal axis.

19. A distributor as recited in claim 1, wherein the outlet section of the hub has a high axial point at a common axial position with the venturi section outlet of the venturi section wall relative to the longitudinal axis.

20. A distributor as recited in claim 1, wherein the hub has a diameter of at least about 58% that of the venturi section wall.

21. A distributor as recited in claim 1, wherein the hub has a diameter of about 40% to about 90% of that of the venturi section wall.

22. A distributor as recited in claim 1, wherein the venturi section wall has a diameter and a length in an axial direction with respect to the longitudinal axis, wherein the length of the venturi section wall is at least about 70% to about 140% as long as the diameter of the cylindrical wall.

23. A distributor as recited in claim 1, further comprising a plurality of supports, each mounting the hub to the venturi section wall.

24. A distributor as recited in claim 1, further comprising at least one support at an end of the hub, mounting the hub to the venturi section wall.

25. A circulating dry scrubber comprising:
a circulating dry scrubber reactor with an inlet for introducing flue gas and a reactor space for circulating particles for treating flue gas within the reactor space; and
a distributor as recited in claim 1, wherein the venturi section outlet of the distributor is in fluid communication with the inlet of the reactor to supply flue gas thereto.

* * * * *